United States Patent [19]
Poindexter et al.

[11] Patent Number: 6,086,315
[45] Date of Patent: Jul. 11, 2000

[54] EQUIPMENT LIFT WITH HOOKING MECHANISM FOR HOLDING A PORTABLE WORK STATION CART

[75] Inventors: David A. Poindexter, Stoughton; Steven Dale Spoon, Janesville, both of Wis.

[73] Assignee: Precision Handling Systems, Inc., Orfordville, Wis.

[21] Appl. No.: 09/130,792

[22] Filed: Aug. 7, 1998

[51] Int. Cl.[7] .................................................. B65G 67/02
[52] U.S. Cl. .................... 414/549; 280/47.35; 224/310; 414/462; 414/522
[58] Field of Search ............................ 254/3 R; 414/549, 414/477, 462, 546, 541, 522; 224/310; 280/47, 35

[56] References Cited

U.S. PATENT DOCUMENTS

| | | | |
|---|---|---|---|
| 2,590,285 | 3/1952 | Wiltshire | 280/47.35 X |
| 2,901,262 | 8/1959 | Berlin | 280/47.35 X |
| 4,428,631 | 1/1984 | Cope et al. | |
| 4,565,482 | 1/1986 | Baker | 414/462 |
| 5,013,103 | 5/1991 | Addison | |
| 5,056,672 | 10/1991 | Yamada | |
| 5,088,420 | 2/1992 | Russell | |
| 5,183,372 | 2/1993 | Dinverno | |
| 5,209,628 | 5/1993 | Hassell | 414/462 |
| 5,518,310 | 5/1996 | Ellman et al. | |
| 5,549,264 | 8/1996 | West | |
| 5,618,150 | 4/1997 | Poindexter | |
| 5,649,655 | 7/1997 | Kerner | 414/462 X |
| 5,738,261 | 4/1998 | Dula | 414/462 X |
| 5,931,483 | 8/1999 | Haynes | 280/47.35 X |

*Primary Examiner*—Frank E. Werner
*Attorney, Agent, or Firm*—Michael Best & Friedrich LLP

[57] ABSTRACT

A system for handling portable diagnostic equipment. The system includes a powered equipment lift sized and shaped to fit in an overland vehicle. A hooking mechanism is coupled to the bottom of the equipment lift and a portable cart is hooked to the hooking mechanism. The hooking mechanism includes an attachment tube coupled to the bottom of the equipment lift and a pivot bar is inserted through the attachment tube and freely rotatable within it. One or more hooks are coupled to the pivot bar, in one embodiment, one on each end. The hooks are designed to hold a portable workstation cart. The cart has a base platform with a plurality of wheels. In addition to acting as a shelf for heavy equipment, the main platform also supports a vertical frame. The vertical frame has two upstanding arms and supports a second shelf which is designed to accommodate medical equipment. Positioned above the second shelf is a second frame with a flip-out tray. The second frame is adjustably coupled to the arms of the vertical frame. The flip-out tray is designed to hold various devices such as lap-top computers. The hooking mechanism permits the cart to be integrated with the equipment lift and, therefore, allows two types of diagnostic equipment to be handled with one equipment lift: one type of equipment on the lift itself and the other in the workstation cart.

10 Claims, 6 Drawing Sheets

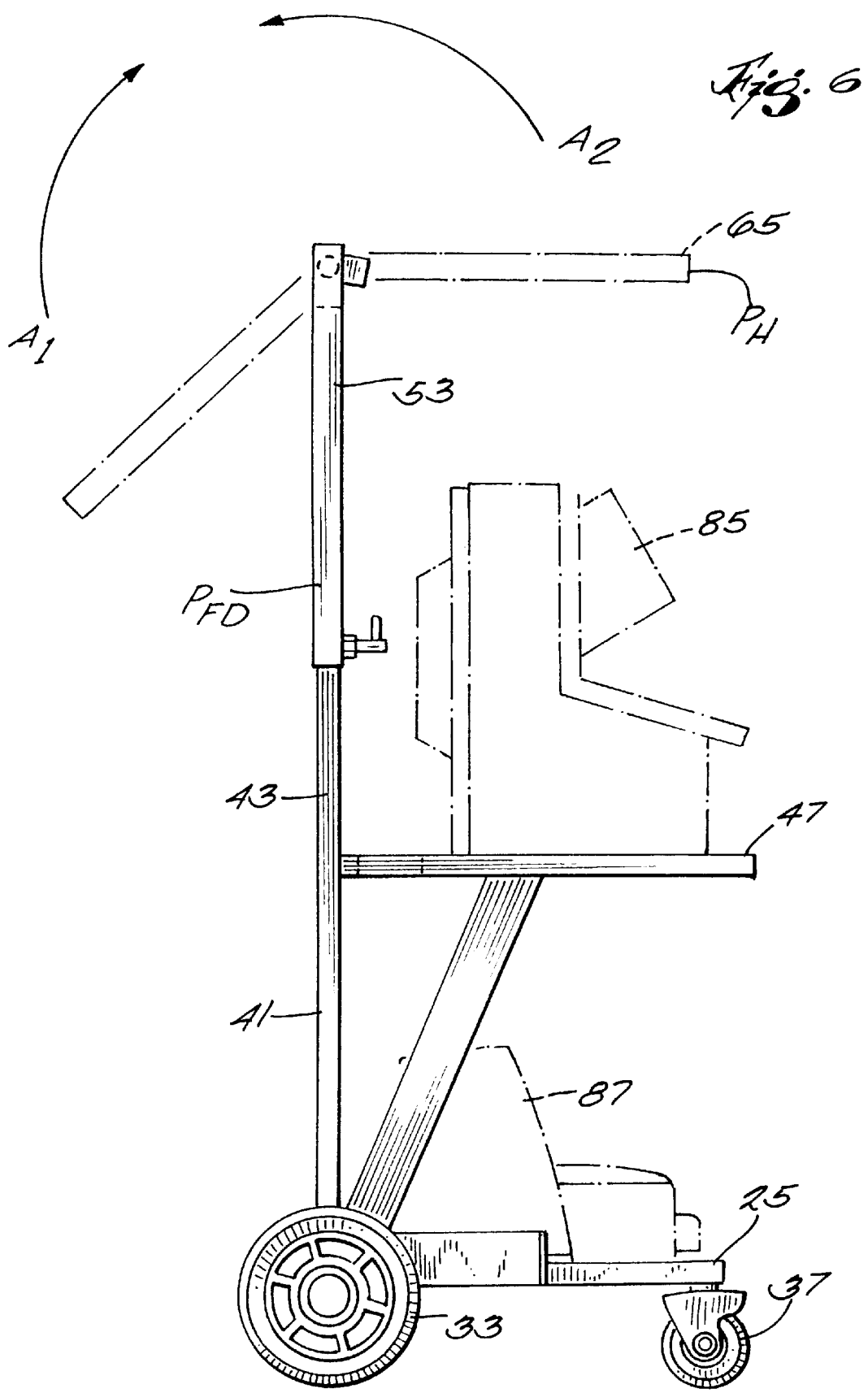

EQUIPMENT LIFT WITH HOOKING MECHANISM FOR HOLDING A PORTABLE WORK STATION CART

FIELD OF THE INVENTION

The present invention relates generally to devices for handling electronic machines, computers, and other similar equipment and, in particular, to an equipment lift and vehicle-based portable work station cart for transporting medical equipment to and from an overland vehicle.

BACKGROUND OF THE INVENTION

In today's medical-care industry, many clinics, medical offices, and similar facilities can not justify the cost of purchasing certain diagnostic equipment. Many types of such equipment can be very expensive. Accordingly, there are a number of services that transport various diagnostic equipment to multiple medical facilities and operate the equipment at the facilities for pre-arranged periods of time. For many medical facilities, the costs associated with contracting for such services are generally more attractive than making an outright purchase of equipment. Of course, for such services to operate efficiently, they require a vehicle to transport the devices and a means to load and unload the devices from the vehicle.

Many devices exist that are designed to manipulate or otherwise handle diagnostic equipment and other cargo that is being loaded or unloaded from transporting vehicles. In addition, numerous type of carts are also known and used to move cargo and equipment to and from transporting vehicles. However, many of these devices suffer from numerous short comings including poor design, poor ergonomics, and high expense to name a few. Furthermore, there is often a need to transport more than one type of diagnostic equipment in a vehicle at a time. Therefore, there is often a need to integrate two or more types of equipment handling systems or devices in a single transporting vehicle. In particular, there is a need to integrate a cart with a powered, equipment-handling lift in a vehicle in order to transport and deliver devices that are used in conjunction with or are complementary to each other.

OBJECTS AND SUMMARY OF THE INVENTION

Therefore, it is an object of the present invention to provide an improved cart for carrying diagnostic equipment that is designed to be coupled to a powered equipment carrying lift.

It is another object of the present invention to provide a cart that is designed to hold portable computer equipment and function as a portable workstation.

These and other objects are achieved in a system for handling equipment having an equipment lift sized and shaped to fit in an overland vehicle. A hooking mechanism is coupled to the bottom of the equipment lift and a portable cart is hooked to the hooking mechanism. The hooking mechanism has an attachment tube coupled to the bottom of the equipment lift. A pivot bar is inserted through the attachment tube and is freely rotatable within it. One or more hooks are coupled to the pivot bar, preferably one on each end.

The hooks are designed to hold a portable workstation cart. The cart has a platform with two axle-mounted wheels and two fully-rotatable coaster wheels. The main platform acts as a shelf for heavy equipment such as a computer printer. The main platform also supports a vertical frame. The vertical frame has two upstanding arms and supports a second shelf which is designed to accommodate various medical equipment such as a flow-rate monitor. Positioned above the second shelf is an C-shaped frame with a flip-out tray. The C-shaped frame is adjustably coupled to the arms of the vertical frame. The flip-out tray is designed to hold various devices such as lap-top computers.

There are many features of the cart and hooking mechanism which provide a superior equipment handling system. The hooking mechanism is pivotable allowing it to be swung out of the way when not in use and to move when the cart is hooked on it. In addition, the cart in the present invention also has adjustable components. Specifically, the height of the flip-out tray on the cart can be adjusted to compensate for the height and position of the user of the cart and may be folded down completely for handling and transportation when the cart is hooked to the lift. These features provide a heretofore unachieved integration of a powered equipment lift with a cart and allow two types of diagnostic equipment to be handled with one equipment lift: one type of equipment on the lift itself and the other in the workstation cart.

These are just some of the features and advantages of the present invention. Many others will become apparent by reference to the detailed description of the invention taken in combination with the accompanying drawings.

BRIEF DESCRIPTION OF THE DRAWINGS

In the drawings:

FIG. 6 is a side view of the portable work station cart of the present invention showing the operation of the flip-out tray.

DETAILED DESCRIPTION

Figure 1:
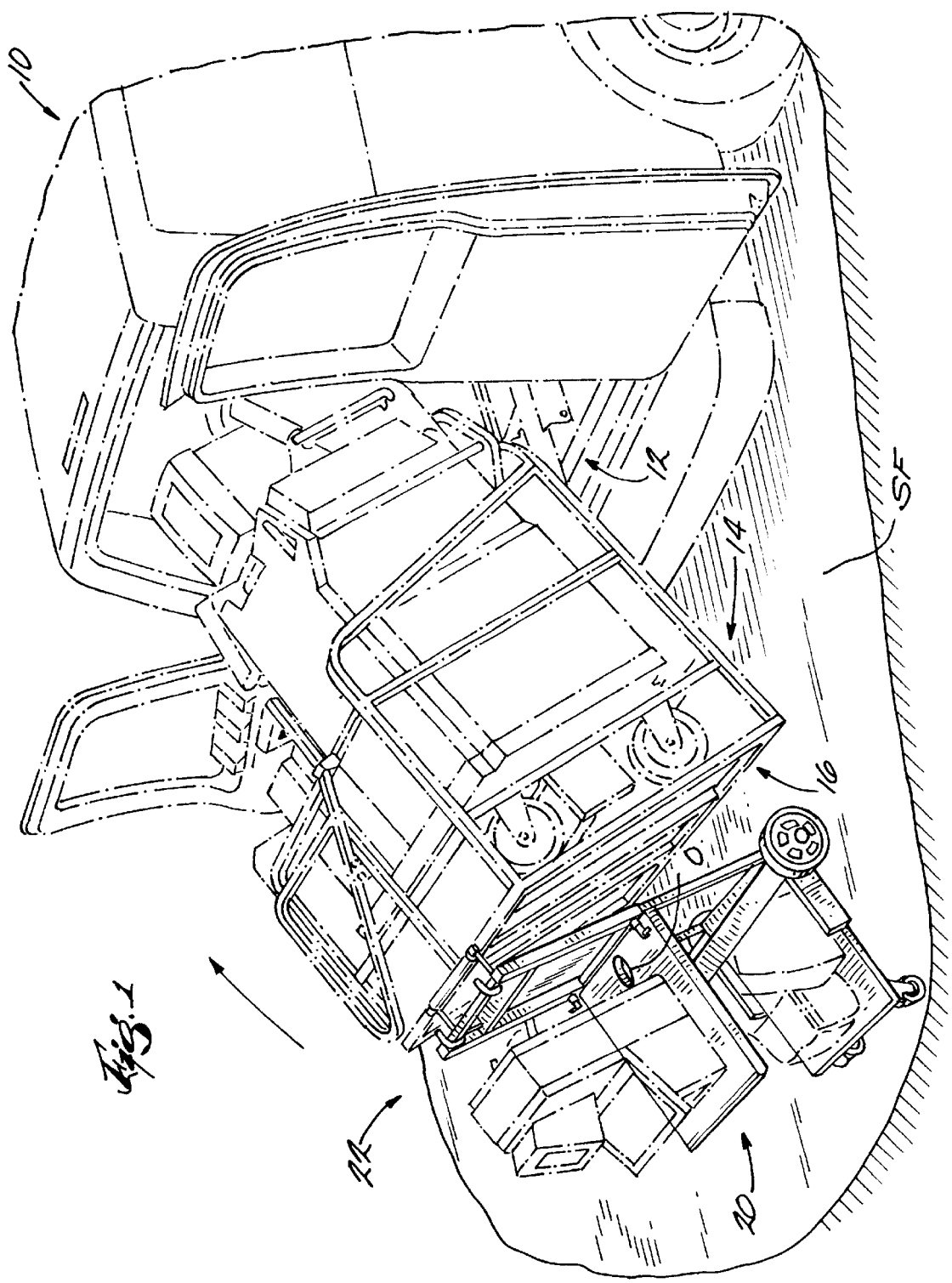
FIG. 1 is a perspective view of a transporting vehicle with a powered equipment lift and a portable work station cart of the present invention hooked on the equipment lift.

A transporting vehicle 10 equipped with a powered equipment lift 12 is shown in FIG. 1. The powered equipment lift 12 is not limited to a specific design, but is preferably one of the lifts shown in U.S. Pat. Nos. 5,618,150 and 5,651,657; the disclosures of which are hereby incorporated by reference herein. The lift 12, like those shown in the noted patents, has a cargo-carrying assembly 14 with a bottom frame or, more generally, a bottom 16. A portable workstation cart 20 of the present invention is coupled to the bottom 16 of the lift 12 by a hooking mechanism 22.

Figure 2:
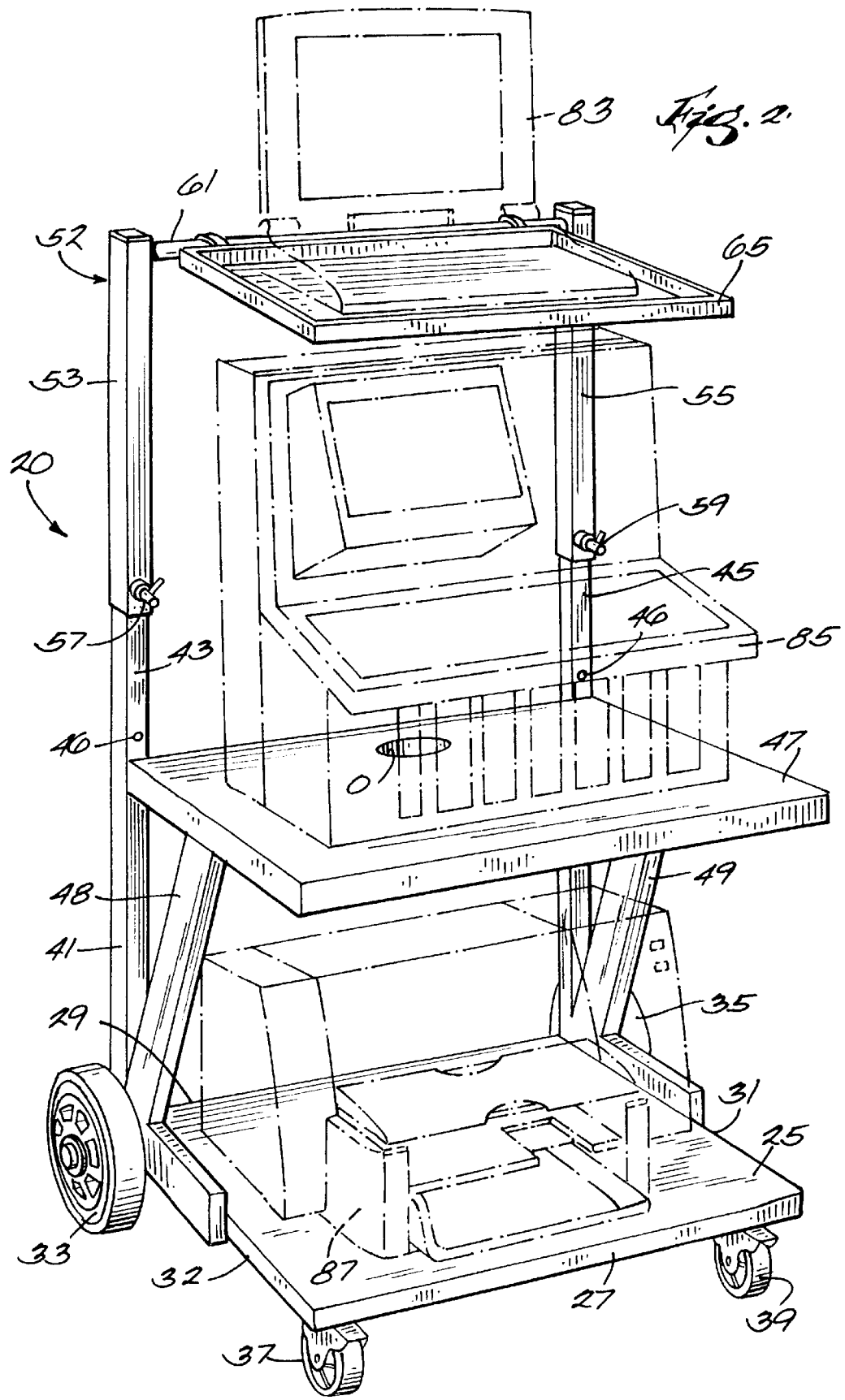
FIG. 2 is a front perspective view of the portable work station cart of the present invention.

As best seen by reference to FIG. 2, the portable workstation cart 20 includes a rectangularly-shaped base or platform 25 with a front 27, rear 29, left side 31, and right side 32. Mounted on the right rear of the platform is a first axle-mounted wheel 33. A second axle-mounted wheel 35 is mounted on the left rear of the platform 25. Two coaster type wheels 37 and 39 are mounted at the front 27 of the platform 25.

Figure 3:
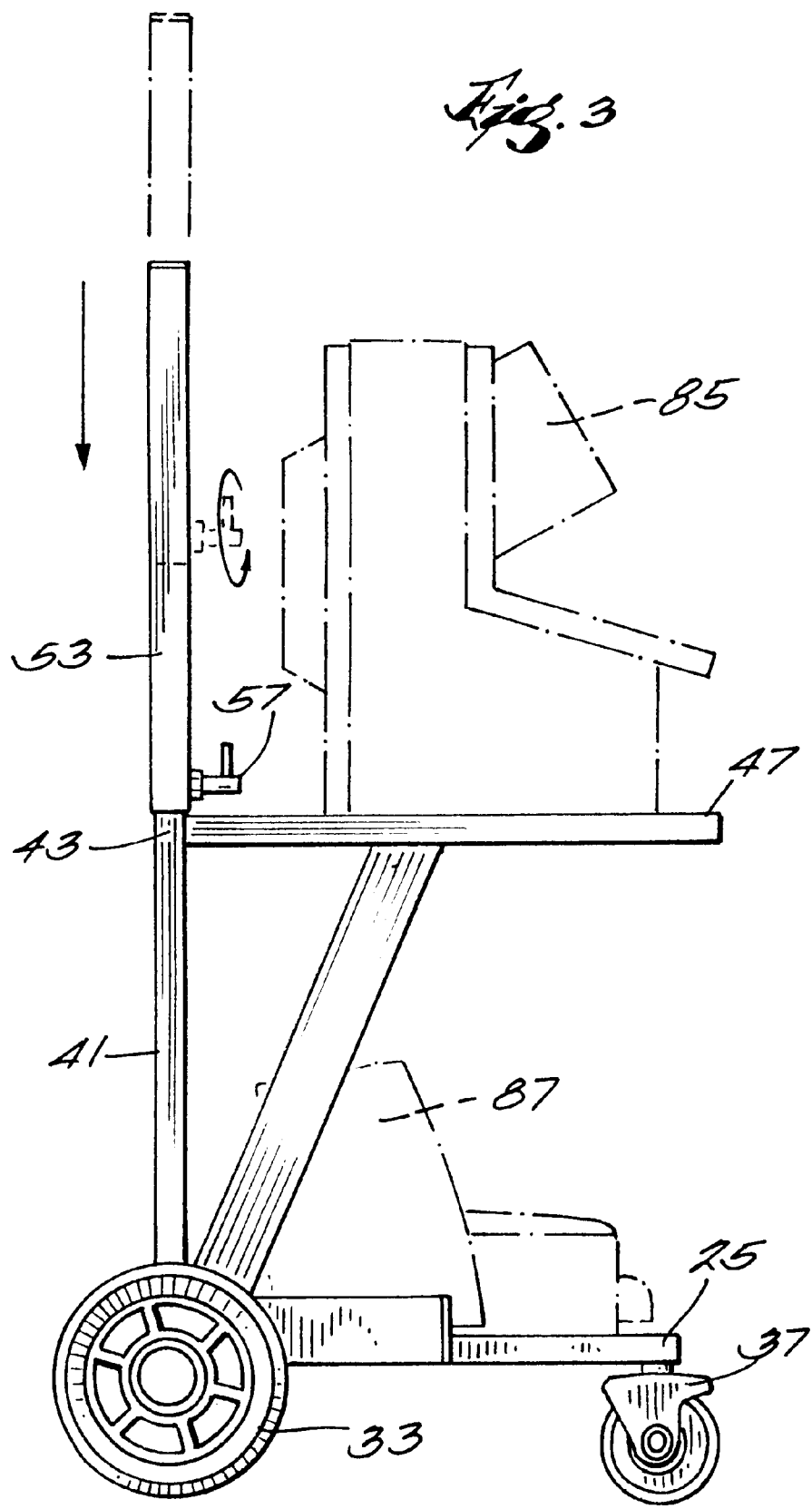
FIG. 3 is a side view of the portable work station cart of the present invention.

A vertical frame 41 having two arms 43 and 45 extends above the platform 25 from its rear 29. The arms 43 and 45 may have one or more holes 46 located at regular intervals along their lengths. Mounted to the frame 41 is a second platform 47. The platform 47 has an opening O through which cables and the like may be routed and is supported by two angled-braces 48 and 49. Above the second platform 47 is a second, adjustable, C-shaped frame 52. The frame 52 has two arms 53 and 55 which are designed to telescope over the arms 43 and 45, respectively. The position of the arms 53 and 55 with respect to the arms 43 and 45 may be adjusted with two pins 57 and 59. The pins may be inserted in the holes 46 located at various positions along the arms 43 and 45 or, alternatively, frictionally engaged at various positions along the arms 43 and 45 to adjust the height of the C-shaped frame 52 and, specifically, a rod 61 mounted between the arms 53 and 55. Adjustment of the rod 61 also adjusts the height position of a flip-out tray 65, which is coupled to the rod 61 (see FIG. 3).

Figure 4:
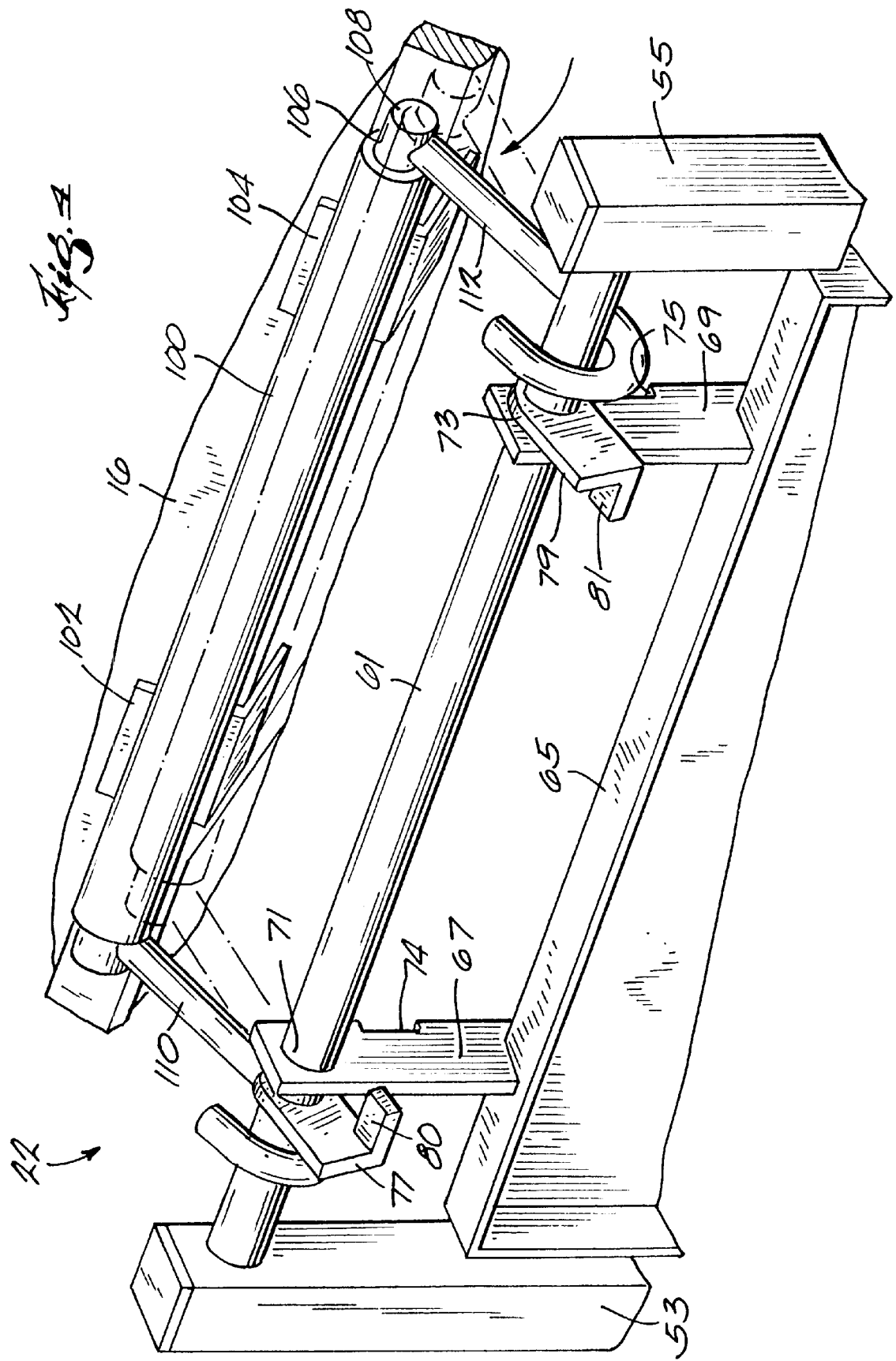
FIG. 4 is a partial, enlarged perspective view of the portable work station cart shown hooked on the equipment lift illustrated in FIG. 1.
Figure 5:
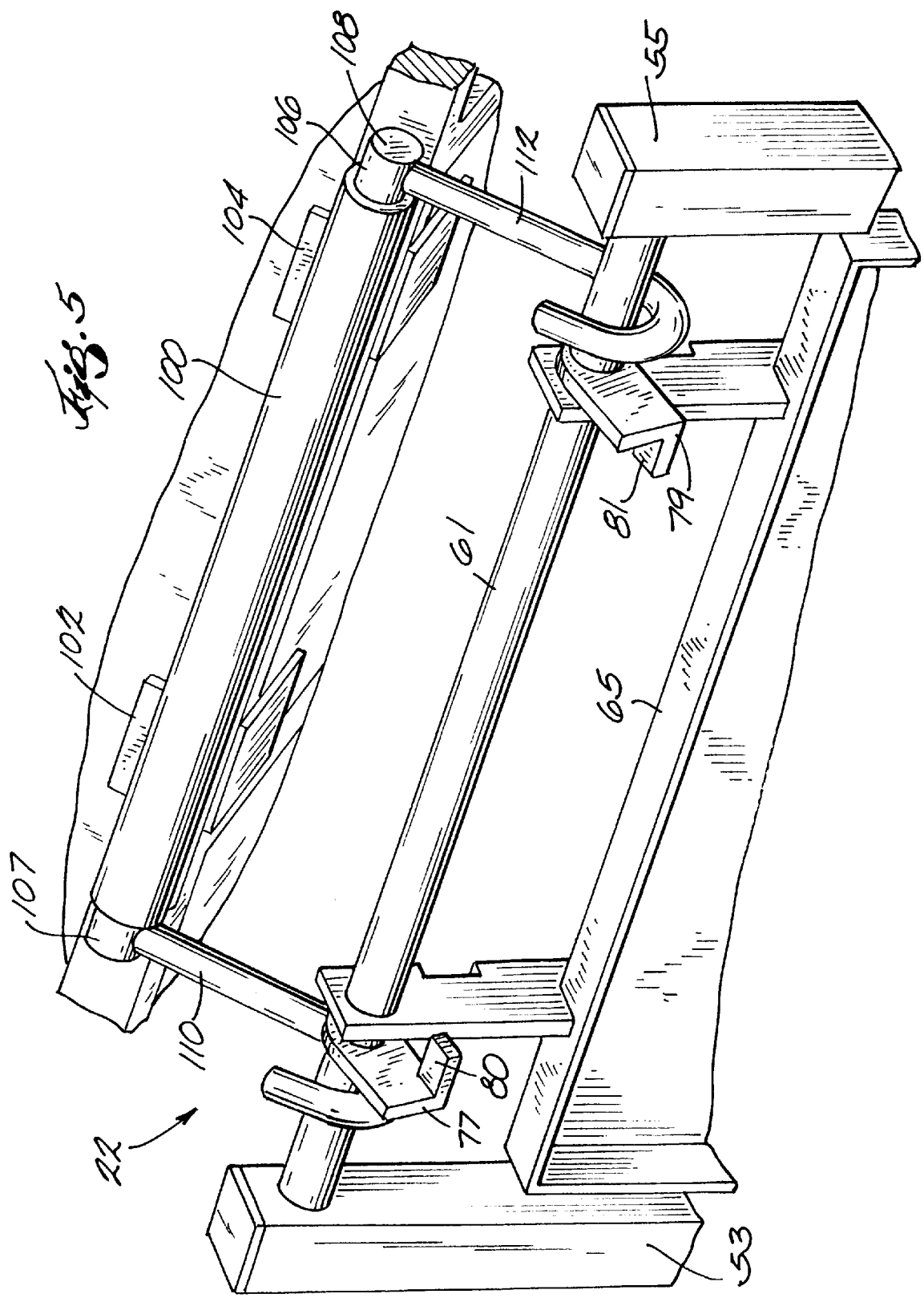
FIG. 5 is another partial, enlarged view of the portable work station cart shown hooked to the bottom of the equipment lift of FIG. 1.

As best seen by reference to FIGS. 4 and 5, the flip-out tray 65 is connected to the rod 61 by two flat bars 67 and 69. The bars 67 and 69 have respective bores 71 and 73 through which the rod 61 is inserted. The bars also have notches 74 and 75. The bores 71 and 73 are sized so that the bars 67 and 69 and, therefore, the tray 65 may rotate about the rod 61 in the directions indicated by the arrows $A_1$ and $A_2$ (FIG. 6) In order to prevent the tray 65 from rotating a full 360° around the rod 61 and to provide a set position for it to rest at, two stops 77 and 79 are fixed to the rod 61. The stops 77 and 79 may be fixed to the rod 61 by screws, welding, or other means known in the art. The stops 77 and 79 have tabs 79 and 81 which inter-lock with the notches 74 and 75 when the tray 65 is rotated in the direction of arrow $A_1$ to a substantially horizontal position $P_H$ (see FIG. 6). The tray 65 may be moved to a folded down position PFD by rotating the tray in the direction of arrow $A_2$.

The tray 65 is sized and shaped to hold a laptop computer 83 (FIG. 2) which may be used to analyze data from a diagnostic device 85 positioned, for example, on the platform 47. Also, a printer or other peripheral 87 may be positioned on the platform 25. With these features, plus the wheels 33, 35, 37, and 39, the cart 20 may be used as a convenient portable workstation for analyzing diagnostic data.

Another feature of the present invention that makes the cart 20 particularly useful is the hooking mechanism 22. As best seen by reference to FIGS. 4 and 5, the hooking mechanism 22 is designed to be coupled to the bottom 16 of the lift 12. The hooking mechanism 22 includes an attachment tube 100 fixed to two flanges 102 and 104. The flanges 102 and 104 may be bolted, welded, or otherwise fixed to the bottom 16 of the lift 12. Inserted through the attachment tube 100 is a pivot bar 106 having a first end 107 and a second end 108. A first hook 110 is mounted to the first end 107 and a second hook 112 is mounted to the second end 108.

The pivot bar 106 is sized and shaped so that it spins or rotates freely within the attachment tube 100. When the cart 20, by the rod 61, is placed on the hooks 110 and 112 and the lift 12 is activated, the pivot bar 106 is free to pivot in response to that movement as shown in phantom in FIG. 4, and the cart 20 may move as well. When the cart 20 is removed from the hooks 110 and 112, the pivot bar 106 may be rotated such that the hooks 110 and 112 do not interfere with placing the bottom of the lift 12 on a flat surface, such as the surface SF.

As is apparent from the discussion above, the present invention provides a superior system for coupling or integrating a powered equipment lift, such as the lift 12, with a readily transportable cart, such as the cart 20, which can carry various equipment and is particularly suited for use as a portable workstation. The height of the flip-out tray 65 on the cart 20 can be adjusted to compensate for the height and position of the user of the cart and may be folded down completely during transportation and when the cart 20 is hooked to the lift 12.

While the present invention is clearly useful as explained herein and has been described in what are believed to be the most preferred forms, it is to be understood that the invention is not confined to the particular examples and arrangement of the components illustrated and detailed herein, but embraces such modified forms thereof as come within the scope of the appended claims.

What is claimed is:

1. A system for handling equipment, the system comprising:
    an equipment lift operable to be mounted in a vehicle, the equipment lift having at least one extension member, moveable between a retracted position and an extended position, and a cargo carrying assembly pivotably mounted to the at least one extension member and movable between a horizontal position and a vertical position the cargo carrying assembly having a bottom;
    a hooking mechanism mounted on the bottom of the cargo handling assembly and having at least one pivotable hook movable to a position that permits positioning of the bottom of the cargo carrying assembly on a flat surface; and
    a portable cart having a frame with a rod, the rod operable to be hooked to the pivotable hook.

2. A system as in claim 1, wherein the hooking mechanism includes:
    an attachment tube coupled to the bottom of the cargo carrying assembly; and
    a pivot bar inserted through the attachment tube;
    the at least one hook is coupled to the pivot bar.

3. A system as in claim 2, wherein the pivot bar has first and second ends and a first hook is coupled to the first end of the pivot bar and a second hook is coupled to the second end of the pivot bar.

4. A system as in claim 1, wherein the portable cart includes:
    a flip-out tray rotatable in at least two directions; and
    at least one stop for holding the flip-out tray at a substantially horizontal position.

5. A system as in claim 4, wherein the portable cart includes:
    a first platform; and
    a second platform positioned above the first platform and below the flip-out tray.

6. A system as in claim 4, wherein the portable cart includes:
    a vertical frame; and
    an second frame for holding the flip-out tray, the second frame coupled to the vertical frame.

7. A system for handling equipment, the system comprising:
    an equipment lift operable to be mounted in a vehicle, the equipment lift having at least one extension member, movable between a retracted position and an extended position, and a cargo carrying assembly pivotably mounted to the at least one extension member and movable between a horizontal position and a vertical position, the cargo carrying assembly having a bottom; and a hooking mechanism mounted on the bottom of the cargo handling assembly and having at least one pivotable hook movable to a position that permits positioning of the bottom of the cargo carrying assembly on a flat surface.

8. A system as in claim 7, wherein the hooking mechanism includes:

an attachment tube mounted on the bottom of the cargo carrying assembly; and a pivot bar inserted through the attachment tube, the at least one hook coupled to the pivot bar.

9. A system as in claim 8, wherein the pivot bar has first and second ends and a first hook is coupled to the first end of the pivot bar and a second hook is coupled to the second end of the pivot bar.

10. A system for handling equipment, the system comprising:

an equipment lift operable to be mounted in a vehicle, the equipment lift having at least one extension member, movable between a retracted position and an extended position, and a cargo carrying assembly pivotably mounted to the at least one extension member and movable between a horizontal position and a vertical position, the cargo carrying assembly having a bottom; and a hooking mechanism, the hooking mechanism having an attachment tube mounted on the bottom of the cargo carrying assembly, a pivot bar inserted through the attachment tube, the pivot bar having a first end and a second end, a first hook on the first end of the pivot bar, and a second hook on the second end of the pivot bar.

* * * * *